(12) United States Patent
Okuyama et al.

(10) Patent No.: US 7,040,761 B2
(45) Date of Patent: May 9, 2006

(54) IMAGE DISPLAY APPARATUS, IMAGE DISPLAY SYSTEM, AND ILLUMINATION SYSTEM

(75) Inventors: Atsushi Okuyama, Saitama (JP); Hiroyuki Kodama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 421 days.

(21) Appl. No.: 09/877,768

(22) Filed: Jun. 8, 2001

(65) Prior Publication Data

US 2002/0036903 A1 Mar. 28, 2002

(30) Foreign Application Priority Data

Jun. 8, 2000 (JP) ........................................ 2000-172129

(51) Int. Cl.
*G03B 21/14* (2006.01)

(52) U.S. Cl. ........................ 353/38; 353/101; 362/309
(58) Field of Classification Search ................... 353/38, 353/101, 102; 362/277, 307, 308, 309, 319, 362/336
See application file for complete search history.

(56) References Cited

U.S. PATENT DOCUMENTS

| 4,988,188 | A | * | 1/1991 | Ohta | ........................ | 353/122 |
|---|---|---|---|---|---|---|
| 5,786,939 | A | * | 7/1998 | Watanabe | ..................... | 359/621 |
| 6,062,695 | A | * | 5/2000 | Kakuda et al. | ................ | 353/38 |
| 6,142,634 | A | * | 11/2000 | Ogawa et al. | ................. | 353/38 |
| 6,183,094 | B1 | * | 2/2001 | Ohta | ............................ | 353/38 |
| 6,283,599 | B1 | * | 9/2001 | Lin | ............................. | 353/101 |
| 6,552,760 | B1 | * | 4/2003 | Gotoh et al. | ................... | 349/56 |
| 6,637,892 | B1 | * | 10/2003 | Okuyama et al. | .............. | 353/38 |

FOREIGN PATENT DOCUMENTS

JP 9-54279 2/1997

* cited by examiner

*Primary Examiner*—William C. Dowling
(74) *Attorney, Agent, or Firm*—Morgan & Finnegan, L.L.P.

(57) ABSTRACT

Conventionally, concentrated illumination of a central portion of an image (about 40–60% of the whole image) in which information such as letters and a picture tends to concentrate (centrally concentrated illumination) and uniform illumination of the whole image (uniform illumination) can be carried out by using two separate apparatuses, but no single conventional image display apparatus can carry out both of the two types of illumination. Accordingly, an object of the present invention is to provide a liquid crystal display apparatus which can carry out centrally concentrated illumination, uniform illumination, and various other illumination states (illumination distributions). According to the present invention, an image display apparatus (such as a liquid crystal projector) is structured such that a fly-eye lens or a part thereof in an illumination optical system for illuminating an image forming element is moved to vary the illumination distribution on the image forming element.

46 Claims, 16 Drawing Sheets

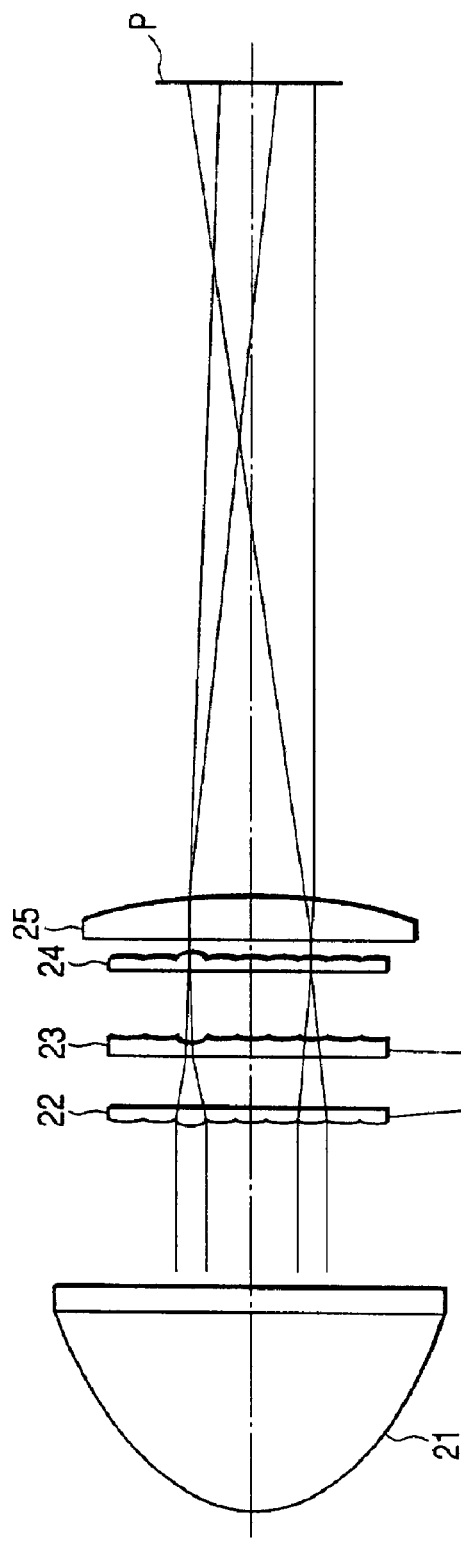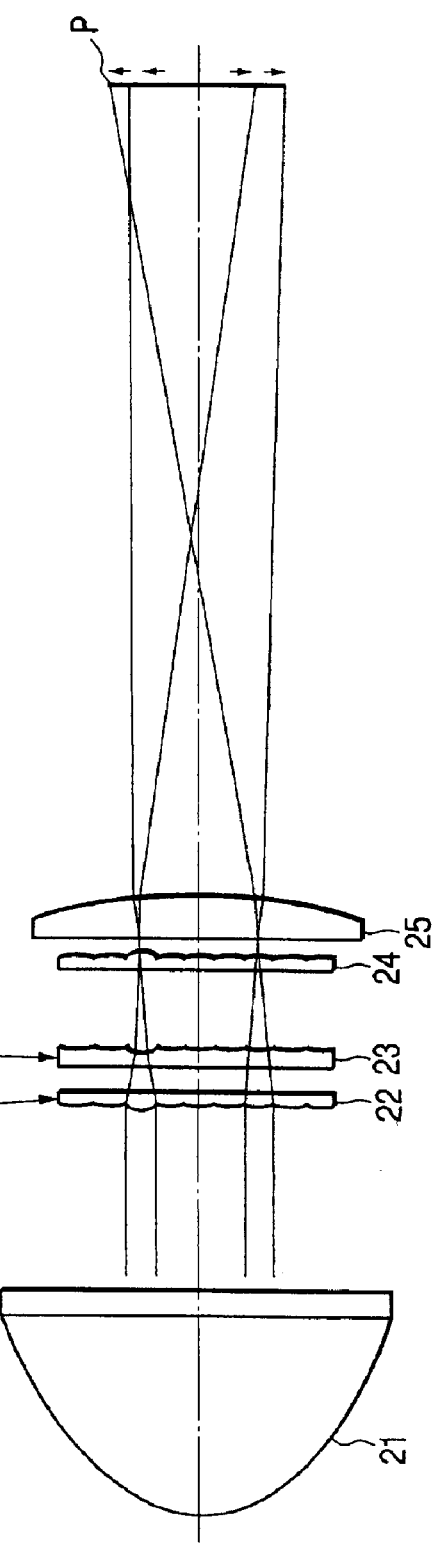

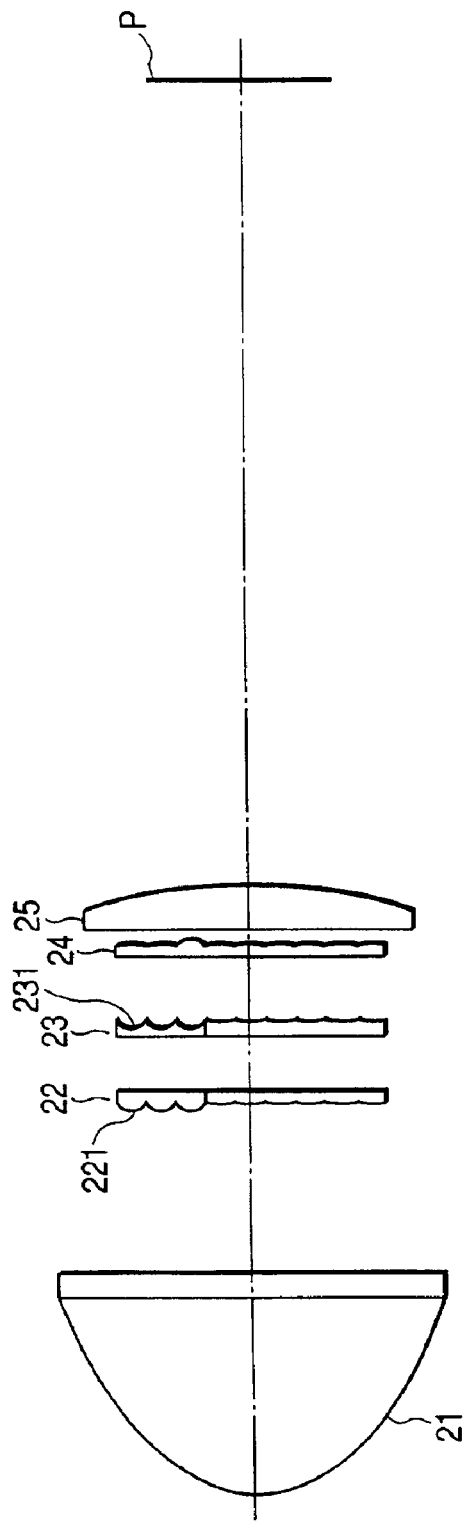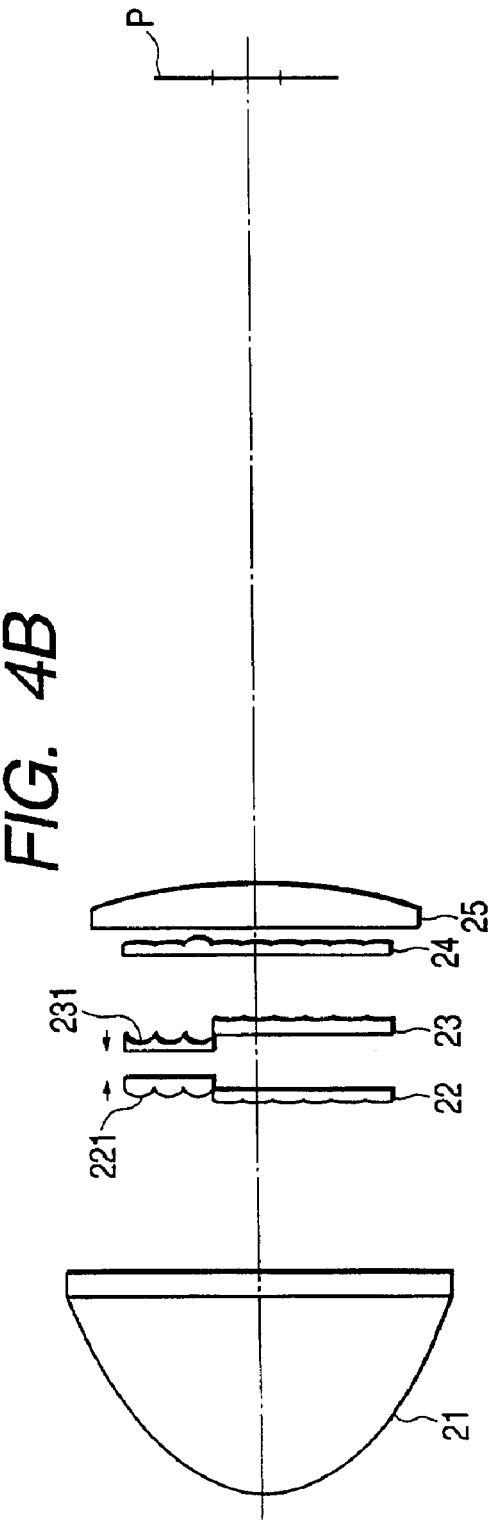

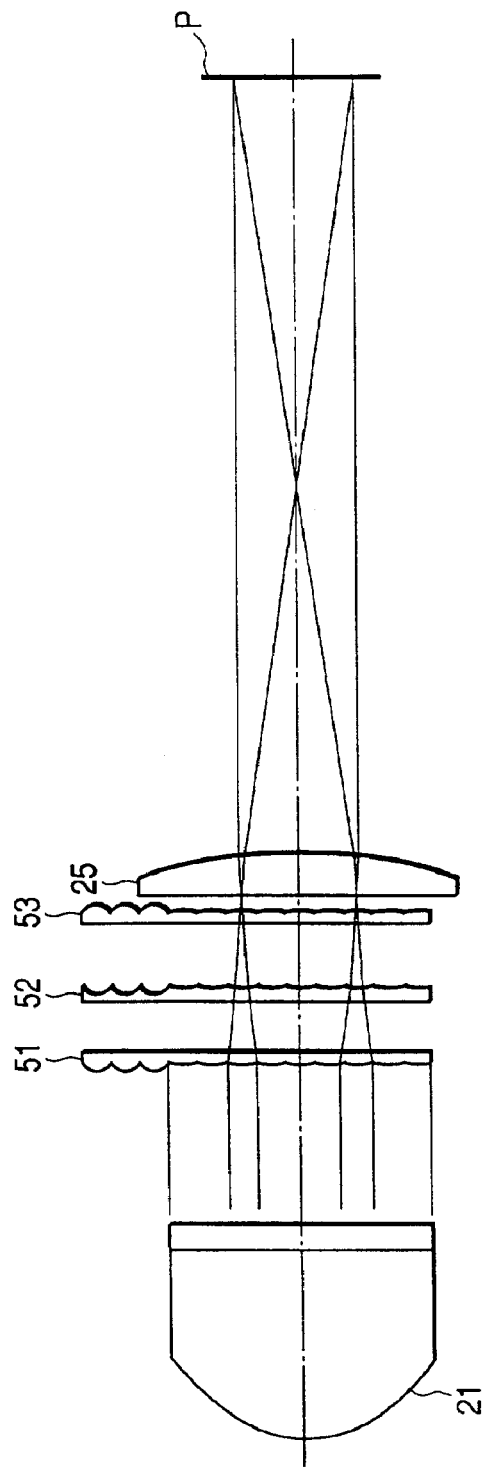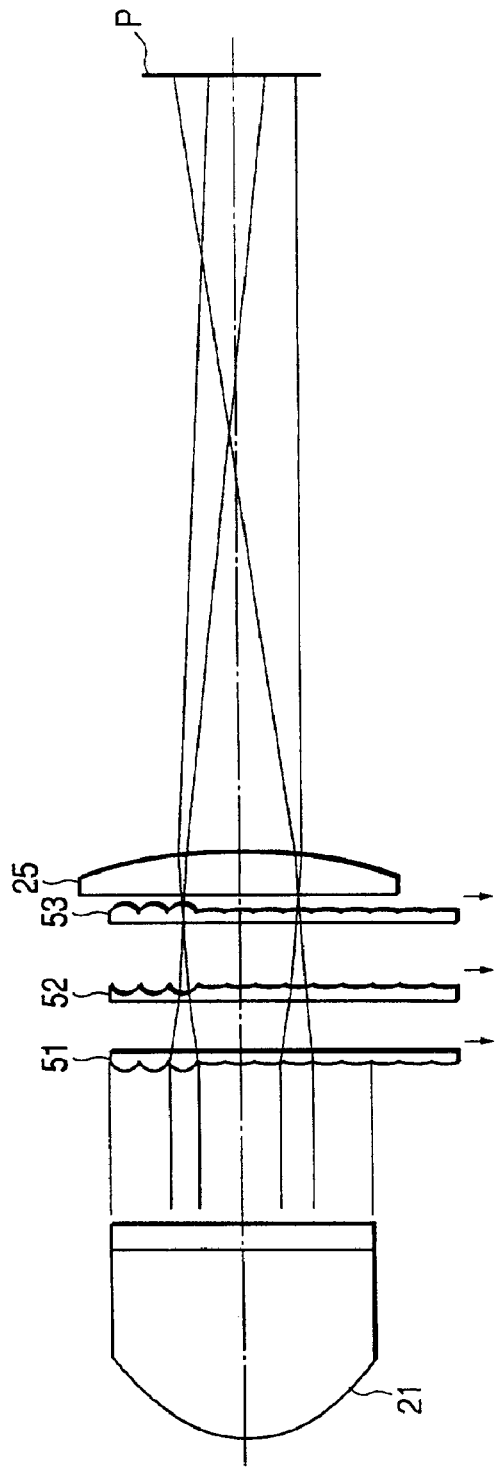

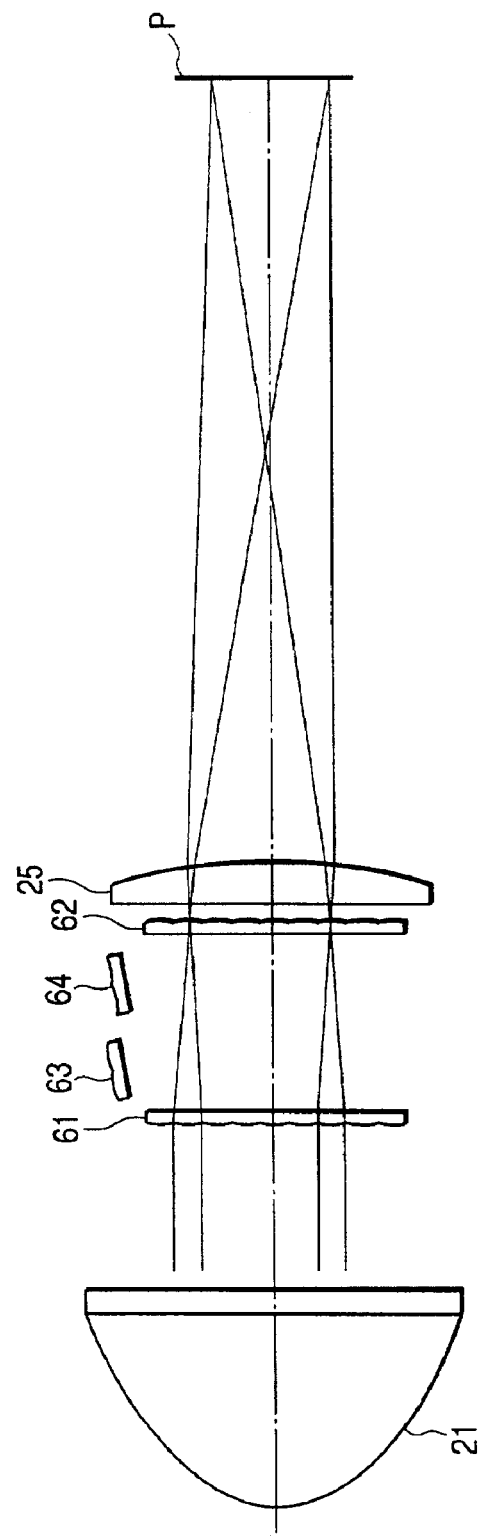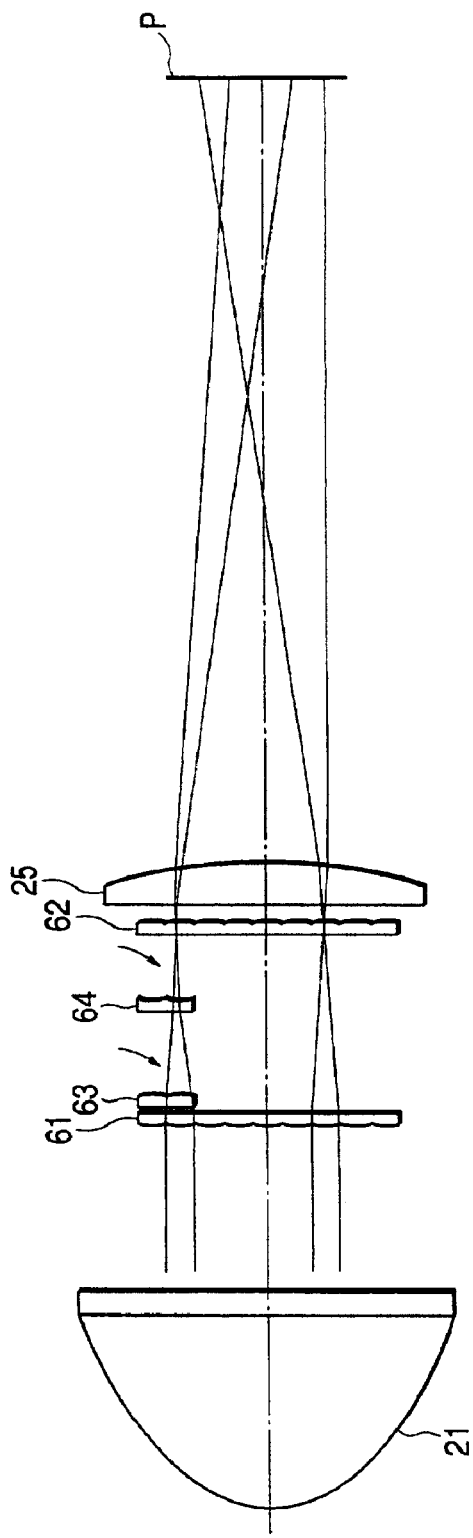

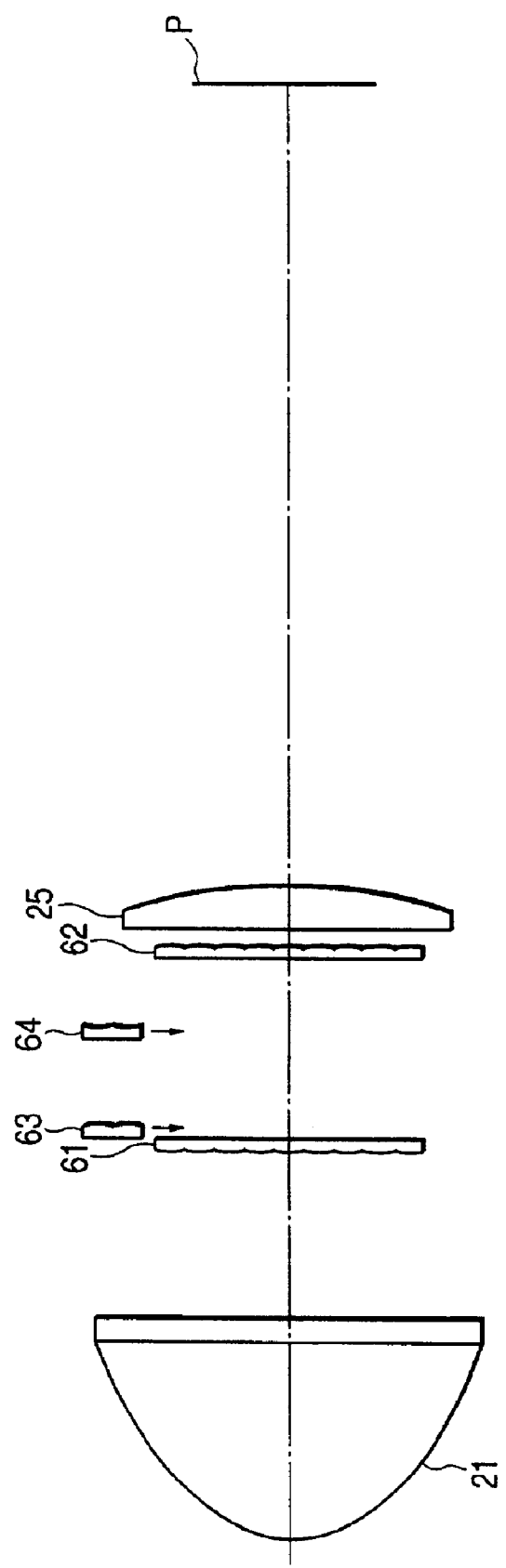

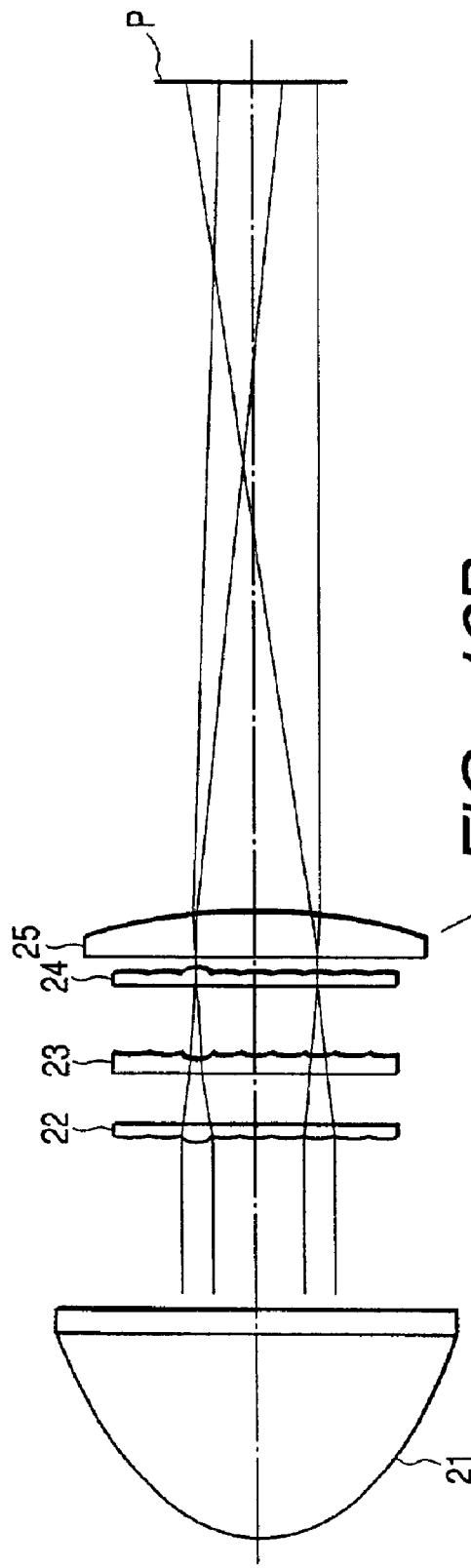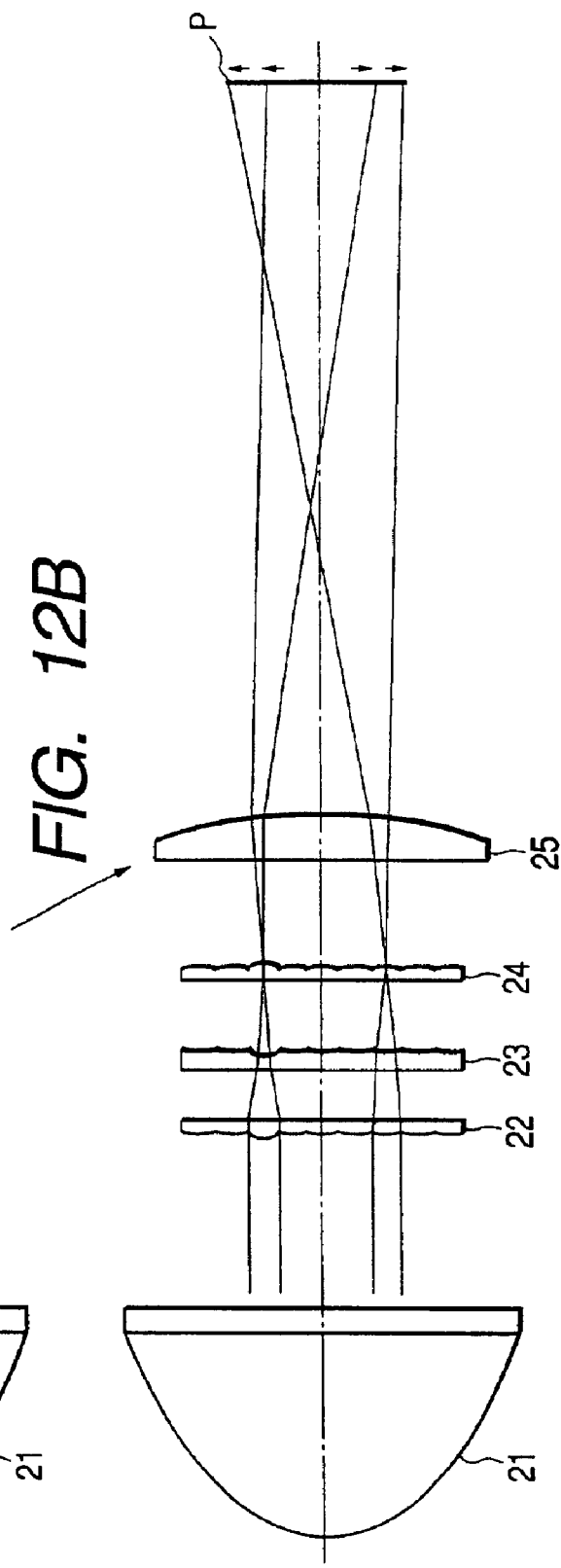

IMAGE DISPLAY APPARATUS, IMAGE DISPLAY SYSTEM, AND ILLUMINATION SYSTEM

BACKGROUND OF THE INVENTION

1. Field of the Invention

The present invention relates to an image display apparatus for displaying on a screen or the like what is displayed on a display of a personal computer, what is displayed on a TV screen, a movie, or the like.

2. Related Background Art

These days, presentation materials prepared with a personal computer, what is displayed on a TV, a movie, or the like are often enlarged and displayed on a, screen or the like using an image display apparatus such as a liquid crystal projector. In this case, important information contained in the materials, on the display, or the like is often displayed in a specified region (generally, a central portion) of a displayed image. In a liquid crystal projector or the like, in order to emphasize important information, it is effective to increase the brightness (increase the contrast) of a region where the important information is displayed. In other words, important information often concentrates in a specified region of an image, and, in order to emphasize the important information, there is an increasing need for displaying the specified region of the displayed image at higher brightness.

Japanese Patent Laid-open Application No. 9-54279 proposes a method of displaying, with a liquid crystal projector, a central portion of an image at higher brightness than that of a peripheral portion. The disclosed method is as follows. An illumination optical system for illuminating an image forming element (a liquid crystal display panel in the case of a liquid crystal projector) comprises two fly-eye lenses. Respective lenses in each of the two fly-eye lenses all have the same focal length. Two of the respective lenses which overlap with each other in a direction of an optical axis makes a pair. The focal lengths of the lenses and the like are set such that a region of the image forming element illuminated with light through such pairs of the lenses is narrower than an effective region (a region where the image is formed on the image forming element). In the fly-eye lenses, since the positions of the respective lenses making a pair are slightly shifted from each other along the optical axis, the regions illuminated by the respective lenses making a pair are also slightly shifted from each other in a plane perpendicular to the optical axis. As a result, the illumination in the central portion of the effective region where more overlap of illumination occurs becomes higher than that in the peripheral portion of the effective region.

However, since such a structure is fixedly arranged in the illumination optical system, the illumination distribution of the illuminated image forming element can not be changed from the state where the central portion has the higher illumination. Therefore, there is a problem that, in case important information is also included in the peripheral portion of the image, for example, in case of a display of a personal computer, the information is difficult to view due to the lower illumination in the peripheral portion.

SUMMARY OF THE INVENTION

The present invention is made in view of the above, and an object of the present invention is to provide a liquid crystal display apparatus which can carry out centrally concentrated illumination, uniform illumination, and various other illumination states (illumination distributions).

According to an aspect of the present invention, an image display apparatus comprises at least one image forming element, and an illumination optical system for illuminating the image forming element with light from a light source, wherein an image is formed through modulation of the light by the image forming element, and the illumination optical system can vary a light intensity distribution of the light on the image forming element.

According to another aspect of the present invention, the apparatus can supply a plurality of different distributions as the light intensity distribution of the light on the image forming element.

According to still another aspect of the present invention, the apparatus can vary the light intensity distribution of the light in an effective region of the image forming element.

According to yet another aspect of the present invention, the illumination optical system has a secondary light source forming member for forming a plurality of secondary light sources, and, when the image forming element is illuminated with a plurality of light beams from the plurality of secondary light sources, projection magnifications of a part or all of the plurality of light beams to the image forming element are changed so as to make switchable the relationship of the number of overlapping light beams in a central portion of the image forming element and the number of overlapping light beams in a peripheral portion of the image forming element between different and the same, thereby varying the light intensity distribution in an effective region of the image forming element.

According to yet another aspect of the present invention, the illumination optical system has a secondary light source forming member for forming a plurality of secondary light sources, and, when the image forming element is illuminated with a plurality of light beams from the plurality of secondary light sources, the number of overlapping light beams in a central portion of the image forming element is structured to be larger than the number of overlapping light beams in a peripheral portion of the image forming element, and projection magnifications of the plurality of light beams to the image forming element are changed, thereby varying the light intensity distribution in an effective region of the image forming element.

According to yet another aspect of the present invention, the illumination optical system comprises a light condensing optical element and varies the distribution by moving the light condensing optical element in a direction of an optical axis.

According to yet another aspect of the present invention, the illumination optical system comprises at least one lens array as a secondary light source forming member for forming a plurality of secondary light sources, and varies the distribution by moving at least a part of the at least one lens array.

According to yet another aspect of the present invention, the illumination optical system varies the distribution by moving at least a part of the at least one lens array in a direction of an optical axis.

According to yet another aspect of the present invention, the illumination optical system varies the distribution by moving at least a part of the at least one lens array in a direction perpendicular to an optical axis.

According to yet another aspect of the present invention, the illumination optical system varies the distribution by rotating at least a part of the at least one lens array.

According to yet another aspect of the present invention, an image display apparatus comprises at least one image forming element, and an illumination optical system for illuminating the image forming element with light from a light source, wherein an image is formed through modulation of the light by the image forming element, and the illumination optical system can vary an illumination distribution in an effective region of the image forming element.

According to yet another aspect of the present invention, the apparatus further comprises a projection optical system for projecting an image formed by the image forming element on a projection surface, wherein the projection optical system overlappingly projects on the projection surface images formed by the image forming elements.

According to yet another aspect of the present invention, the apparatus further comprises image forming elements for red, green, and blue, respectively, and a plurality of dichroic mirrors for combining colors from the image forming elements.

According to yet another aspect of the present invention, the apparatus further comprises image forming elements for red, green, and blue, respectively, and a plurality of dichroic prisms for combining colors from the image forming elements.

According to yet another aspect of the present invention, an image display system comprises the image display apparatus set forth in the foregoing, and an image recording apparatus for supplying an image signal to the image display apparatus.

According to yet another aspect of the present invention, an image display system comprises the image display apparatus set forth in the foregoing, and a computer for supplying an image signal to the image display apparatus.

According to yet another aspect of the present invention, an illumination system comprises a secondary light source forming member for forming a plurality of secondary light sources from light from a light source, wherein an illuminated surface is illuminated with a plurality of light beams from the plurality of secondary light sources, and projection magnifications of a part or all of the plurality of light beams to the illuminated surface are changed, thereby varying an illumination distribution on the illuminated surface.

According to yet another aspect of the present invention, an illumination system comprises a secondary light source forming member for forming a plurality of secondary light sources from light from a light source, wherein an illuminated surface is illuminated with a plurality of light beams from the plurality of secondary light sources, and projection magnifications of a part or all of the plurality of light beams to the illuminated surface are changed, thereby varying an illumination distribution in an effective region of the illuminated surface.

BRIEF DESCRIPTION OF THE DRAWINGS

FIGS. 1A and 1B are end views of an illumination system of Embodiment 1.

FIGS. 4A and 4B are end views illustrating a modification of Embodiment 1.

FIGS. 9A and 9B are end views of an illumination system of Embodiment 3.

FIGS. 10A and 10B are end views of an illumination system of Embodiment 4.

FIG. 11 is an end view of a modification of the illumination system of Embodiment 4.

FIGS. 12A and 12B are end views of an illumination system of Embodiment 5.

DESCRIPTION OF THE PREFERRED EMBODIMENTS

Embodiments of an optical system according to the present invention are now described with reference to the drawings. First, description common to all the embodiments is made.

Figure 14:
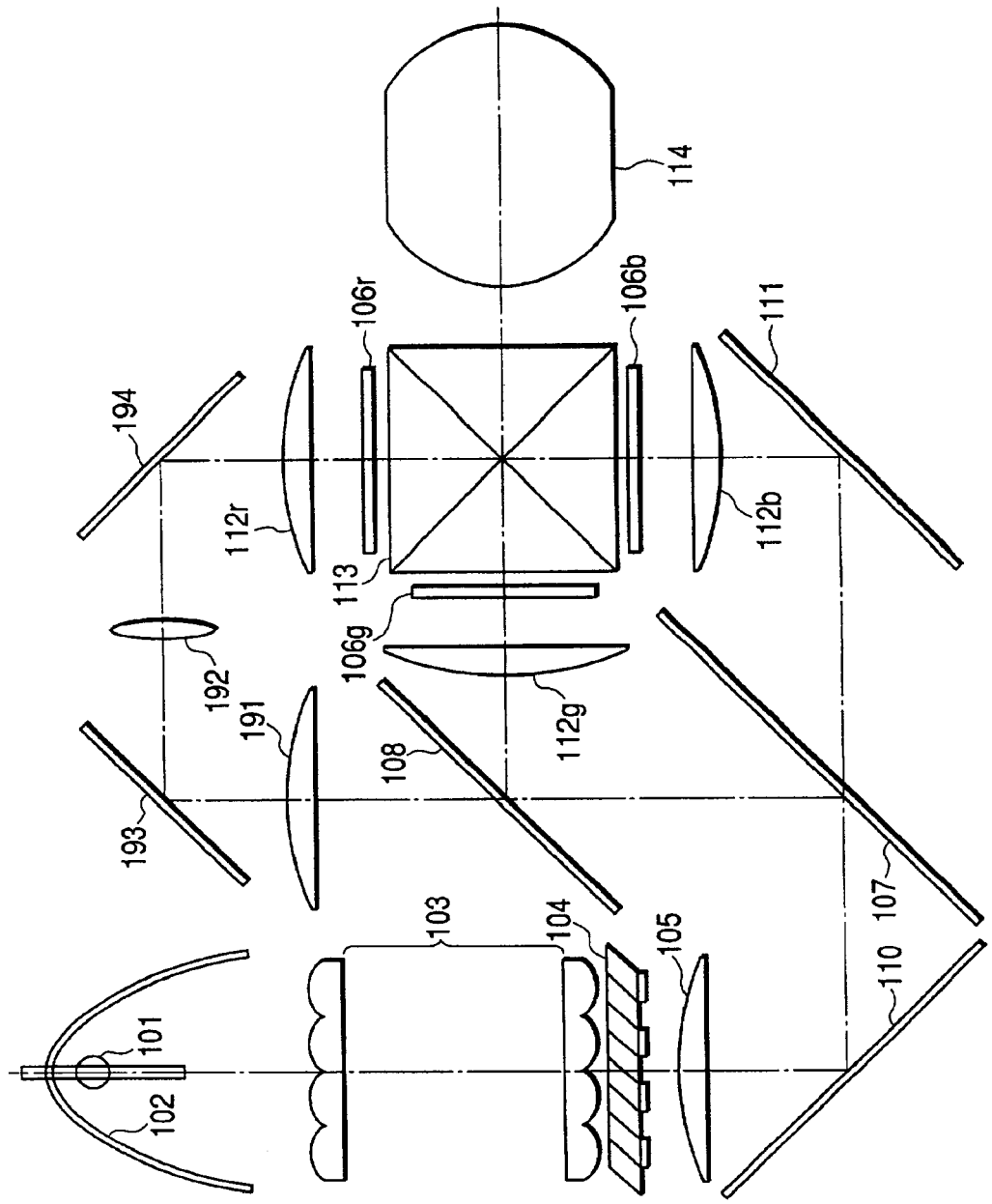
FIG. 14 illustrates optical arrangement in a conventional projector.

Though all the embodiments have only one image forming element (single-plate type), of course the present invention may also be applied to a case where there are three image forming elements (three-plate type). In FIG. 14, reference numeral 101 denotes a light source, reference numeral 102 denotes a condenser mirror, reference numeral 103 denotes an integrator, reference numeral 104 denotes a polarizing conversion element, reference numeral 105 denotes a condenser lens, reference numerals 112b, 112g, and 112r denote field lenses, reference numerals 191 and 192 denote relay lenses, reference numerals 110, 111, 193, and 194 denote reflector mirrors, reference numerals 107 and 108 denote dichroic mirrors, reference numerals 106b, 106g, and 106r denote image forming elements, reference numeral 113 denotes a color combining prism, and reference numeral 114 denotes a projection system. For the sake of simplicity, all the embodiments are described and illustrated in the figures as the single-plate type.

Further, the embodiments are described with a focus being on switching between centrally concentrated illumination and uniform illumination. This is because that the switching can be made between the centrally concentrated illumination and the uniform illumination represents most straightforwardly that a light intensity distribution or an illumination distribution on the image forming element is variable. However, the present invention is not limited to such switching between the centrally concentrated illumination and the uniform illumination.

(Embodiment 1)

Figure 3:
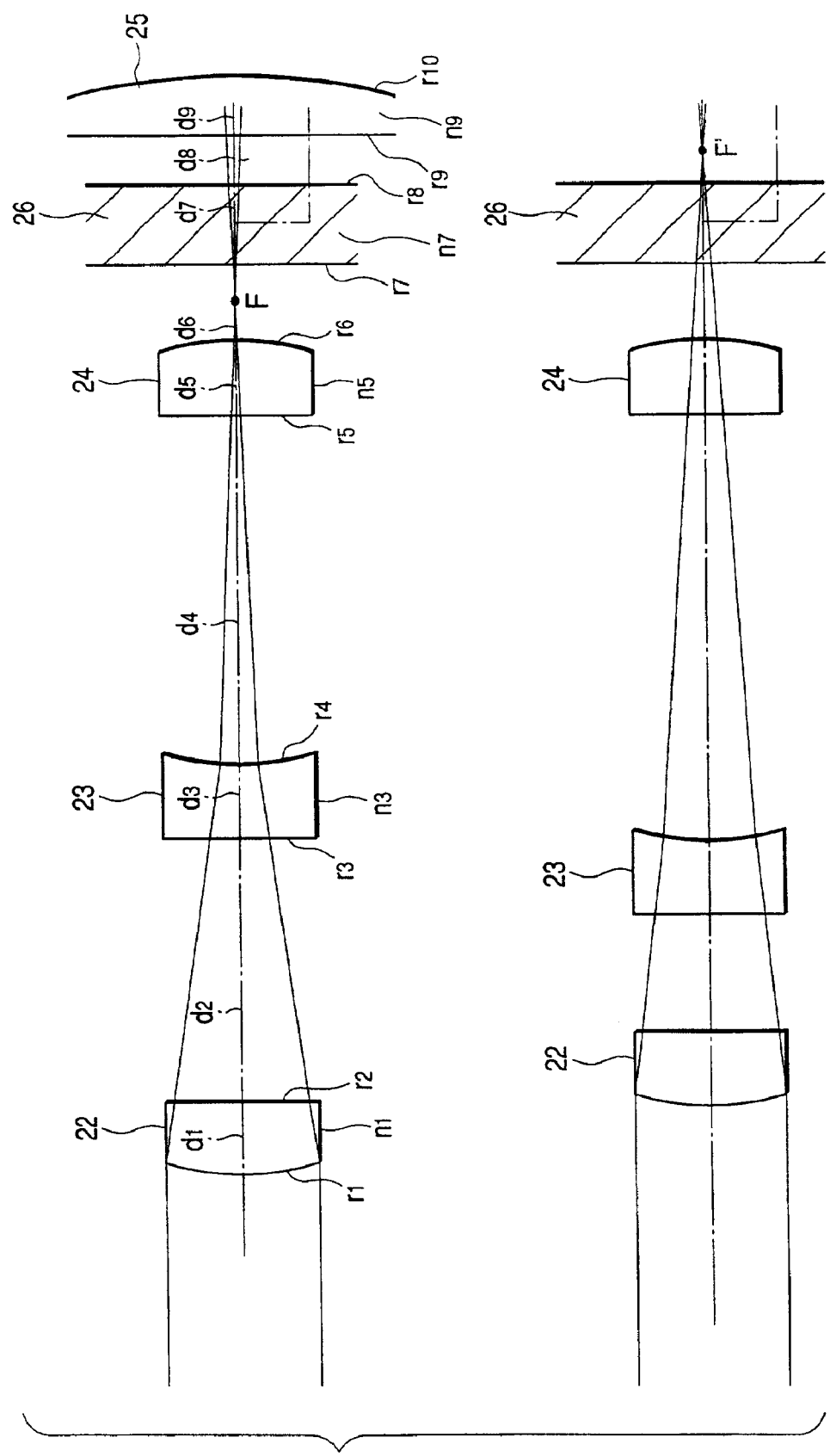
FIG. 3 is an end view illustrating the relationship between a light converging point and a polarizing conversion element of Embodiment 1.
Figure 5:
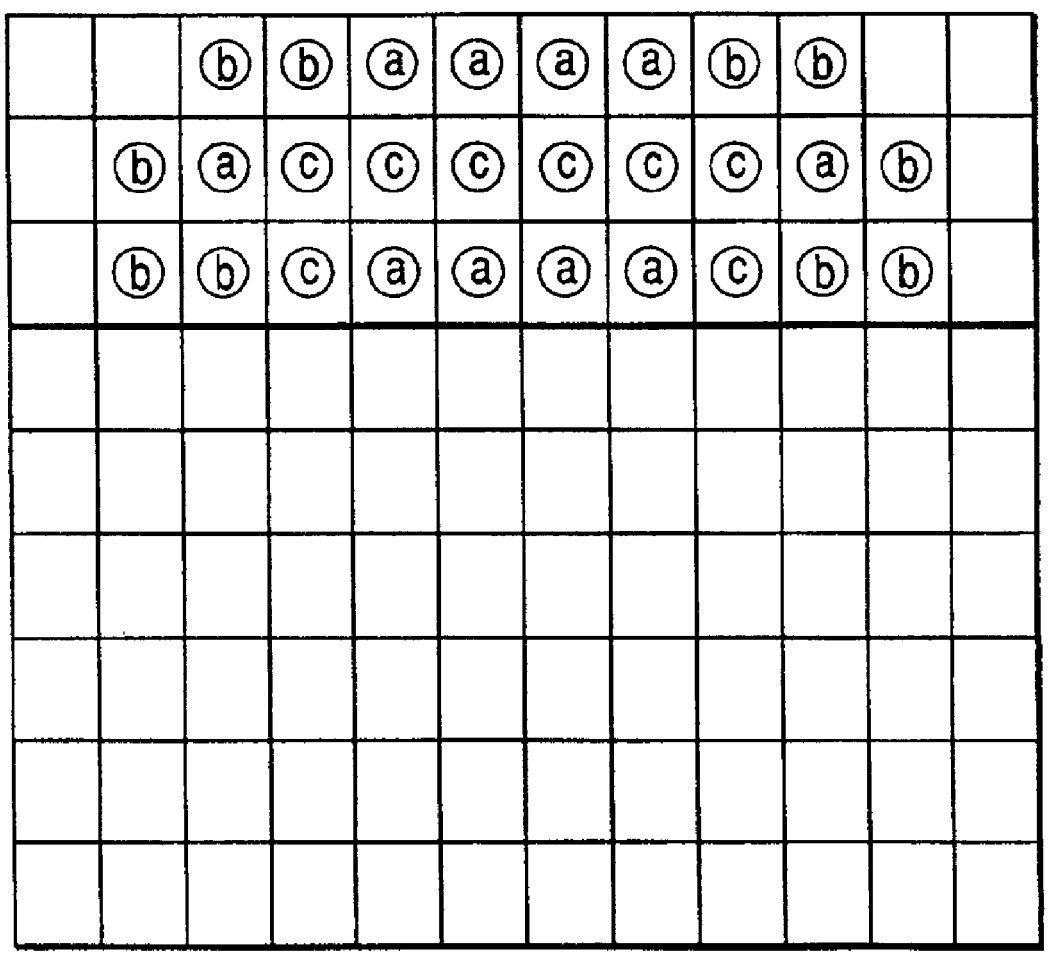
FIG. 5 illustrates arrangement of individual lenses in a fly-eye lens of the modification of Embodiment 1.

FIGS. 1A and 1B illustrate Embodiment 1 of the present invention. In the figures, a reflector mirror 21 condenses light from a light source, a first fly-eye lens 22 has a positive refractive power, a second fly-eye lens 23 has a negative refractive power, and a third fly-eye lens 24 has a positive refractive power, which form an integrator for forming an uniformly illuminated region. Reference numeral 25 denotes a condenser lens, and P is an image forming element. Though not shown in FIGS. 1A and 1B, providing an polarizing conversion element 26 between the third fly-eye lens 24 and the condenser lens 25 to make the same the direction of the polarized light results in improvement in the efficiency of utilizing the light as shown in FIG. 3.

Figure 13:
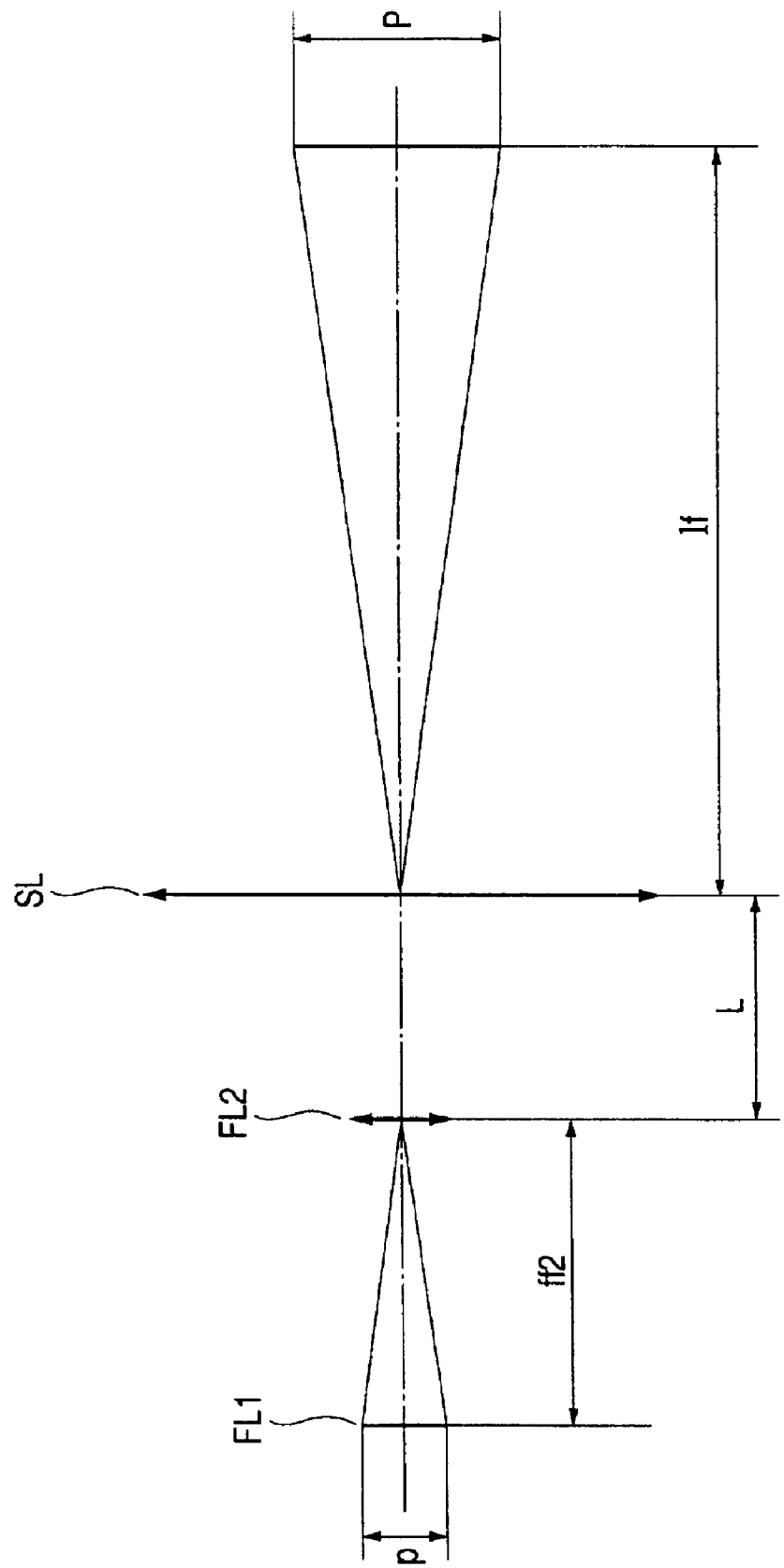
FIG. 13 is a view for explaining the relationship between the size of each lens of the Fly-eye lens and the size of an illumination area on the image forming element illuminated by each lens of the Fly-eye lens.

FIG. 13 is a view for explaining the relationship between the size of each lens of the fly-eye lens and the size of an illumination area on the image forming element illuminated by each lens of the fly-eye lens in the illumination optical system of the present embodiment. Reference numerals FL1, FL2, and SL denote the position of the first fly-eye lens, the position of the third fly-eye lens, and the position of the condenser lens, respectively. A value of K is defined as follows:

$$p/ff2 = P/lf = K \quad (1)$$

wherein p is the size of each lens of the first fly-eye lens, ff2 is the combined focal length of each lens of the second fly-eye lens and each lens of the third fly-eye lens, lf is the combined focal length of the condenser lens, and P is the size of the illuminated area on the image forming element. Here, the fly-eye lens is structured such that a part of lenses constituting the fly-eye lens has a focal length different from a focal length of the other lenses constituting the same fly-eye lens. In the present embodiment, the value of ff2 is made larger. Namely, sets of lenses which make the value of p/ff2 small are provided. By such construction, the value K (=p/ff2) is made small in the equation (1) and therefore the value of P is made small since the value of lf is unchanged. Namely, the size P of the illumination area is made smaller than the size of the illumination area illuminated by the other sets of lenses. The illumination area having smaller size is located at the center, and therefore the central portion is in a state of higher illuminance. When the illumination area made small is smaller than the effective region of the image forming element, the image to be projected is displayed such that the central portion is brighter than the peripheral portion. On the other hand, when the illumination area made small is larger than the effective region of the image forming element, the image to be projected has a uniform brightness. In the present embodiment, although sets of lenses which make the value of ff2 large are provided, of course sets of lenses which make the value of ff2 small or make the value of p/ff2 large may be provided. In such case, such sets of lenses which make the illumination area larger than that of the other sets of lenses are provided.

Figure 2:
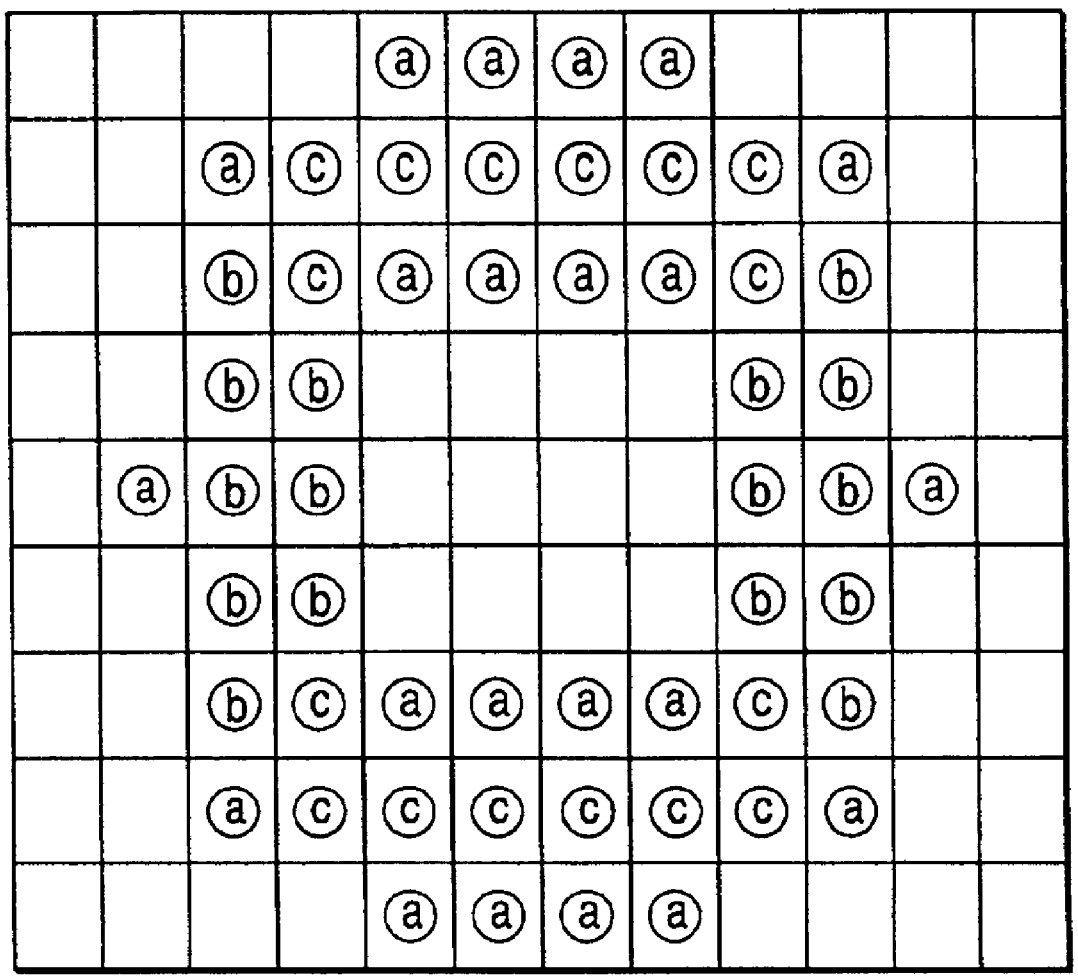
FIG. 2 illustrates arrangement of individual lenses in a fly-eye lens of Embodiment 1.

The individual lenses of the first fly-eye lens according to this embodiment are arranged as illustrated in FIG. 2 when viewed from the light source side. In FIG. 2, rectangular cells represent the individual lenses, and symbols in the cells represent the kinds of the focal lengths of the lenses, respectively. In the present embodiment, the fly-eye lens is composed of lenses which have four kinds of focal lengths such as a, b, c, and no symbol which are different from one another. Also, in the second and third fly-eye lenses, lenses having mutually different focal lengths are arranged in the same way as the first fly-eye lens illustrated in FIG. 2.

Next, a method of switching between this centrally concentrated illumination and uniform illumination is described. In order to materialize uniform illumination with the above-described structure, it is necessary that the illumination area with light from all lenses constituting the fly-eye lens becomes substantially equal to or larger than the effective region on the image forming element.

In the present embodiment, by moving a fly-eye lens forming the integrator in a direction of an optical axis of the illumination system, the combined focal length of the second fly-eye lens and the third fly-eye lens can be made to be variable, which is illustrated in FIG. 1B. Since the second fly-eye lens has a negative focal length while the third fly-eye lens has a positive focal length, what is necessary is to make larger the distance between the second and third fly-eye lenses. As a result, when movement of the fly-eye lens is effected so that the illumination area illuminated by sets of lenses which form the smallest illumination area becomes larger than the effective region of the image forming element, uniform illumination is realized. Conversely, when movement of the fly-eye lens is effected so as to reduce the distance between the second fly-eye lens and the third fly-eye lens, if the illumination area illuminated by the sets of lenses which form the smallest illumination area becomes smaller than the effective region of the image forming element, central localized illumination can be accomplished.

In FIG. 1B, the distance between the first and second fly-eye lenses is structured to be made smaller. This is for the purpose of, in order to make small the loss of light amount when the light passes through the polarizing conversion element, adjusting the position at which light from the light source converges to be near a polarizing conversion element which is not shown. In order to make small the loss of light amount both in case of the centrally concentrated illumination and in case of uniform illumination, it is desirable that, as illustrated in FIG. 3, the light converging positions changes, relative to the polarizing conversion element 26, to F or F' in response to the switching of the illumination state. Alternatively, for the sake of simplification of the mechanism, the light converging positions may not be adjusted and only the second or third fly-eye lens may be moved to switch the illumination distribution.

Table 1 shows data of the lenses of Embodiment 1. As illustrated in FIG. 3, r is the radius of curvature of each surface, d is the surface spacing, n is the refractive index, and ν is the Abbe number. Table 2 shows the radii of curvature of the lenses forming the fly-eye lenses, which correspond to the symbols in the cells illustrated in FIG. 2. Table 3 shows the distances between the fly-eye lenses when the switching between the uniform illumination and the centrally concentrated illumination is made.

TABLE 1

| Surface Number | r | d | n | ν |
|---|---|---|---|---|
| 1 | fr1 | 3.5 | 1.52 | 64 |
| 2 | ∞ | d2 | | |
| 3 | ∞ | 3.5 | 1.52 | 64 |
| 4 | fr2 | d4 | | |
| 5 | ∞ | 3.5 | 1.52 | 64 |
| 6 | fr3 | 5 | | |
| 7 | ∞ | 4.4 | 1.52 | 64 |
| 8 | ∞ | 2 | | |
| 9 | ∞ | 6.06 | 1.52 | 64 |
| 10 | −173.06 | | | |

TABLE 2

| | fr1 | fr2 | fr3 |
|---|---|---|---|
| Without Symbol | 18.48 | 14.67 | −16.78 |
| A | 17.66 | 13.21 | −16.12 |
| B | 17.17 | 11.01 | −15.66 |
| C | 16.19 | 8.67 | −14.93 |

TABLE 3

|  | d2 | d4 |
|---|---|---|
| Uniform | 15.28 | 17.69 |
| Centrally Concentrated | 18.6 | 16.49 |

FIGS. 4A and 4B illustrate a modification of Embodiment 1. In this modification, lenses having different focal lengths in the fly-eye lenses are structured to be arranged only on one side, and a part of the fly-eye lenses including the sets of the lenses illuminating an area which is narrower than the effective region of the image forming element are structured as separate fly-eye lenses 221 and 231. Only the fly-eye lenses 221 and 231 are structured to be moved in the direction of the optical axis. Since an area illuminated by the sets of the lenses illuminating a relatively large region of the image forming element does not extend beyond the effective region of the image forming element by the switching of the illuminated area, the efficiency of utilizing the light can be enhanced.

Alternatively, in such a structure where the fly-eye lenses are divided, the focal lengths of the fly-eye lenses can be changed by changing the refractive index of the medium, with the shape of the individual lens of the fly-eye lenses being unchanged.

In the present embodiment, by the above-described structure, an image display apparatus with which information is easy to view both in the case where the information concentrates in a central portion of the display and in the case where the information also exists in a peripheral portion of the display is provided.

(Embodiment 2)

Figure 6:
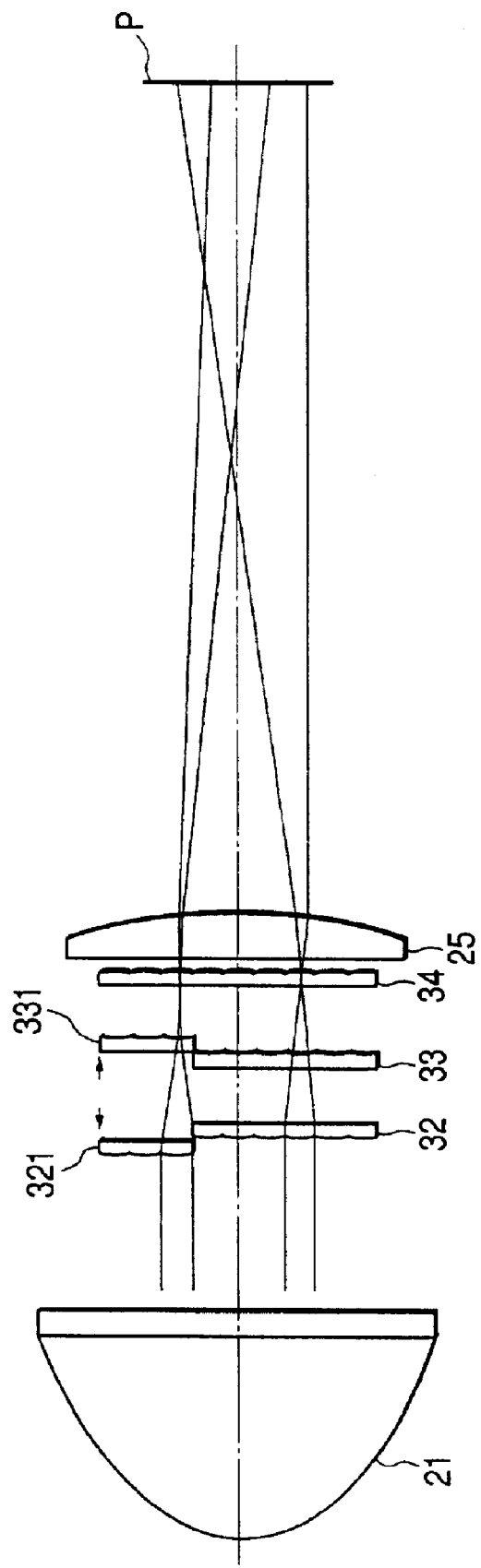
FIG. 6 is an end view of an illumination system of Embodiment 2.

FIG. 6 illustrates Embodiment 2 of the present invention. An integrator of the present embodiment is formed of three fly-eye lenses: a first fly-eye lens 32 formed of positive lenses; a second fly-eye lens 33 formed of negative lenses; and a third fly-eye lens 34 formed of positive lenses, from a light source side in this order. Embodiment 2 is different from Embodiment 1 in that the individual lenses forming a fly-eye lens all have the same focal length.

A method of switching between centrally concentrated illumination and uniform illumination is now described with reference to FIG. 6. In the present embodiment, the first fly-eye lens and the second fly-eye lens are divided into two, respectively, and one of the divided two portions of each of the fly-eye lenses is moved in a direction of an optical axis of an illumination system. When fly-eye lenses 321 and 331 which are divisions of the first and the second fly-eye lenses are at the same positions as those of the first and the second fly-eye lenses, respectively, the value of K defined in the above Equation (1) is the same, which leads to uniform illumination state. On the other hand, when the part 321 of the first fly-eye lens and the part 331 of the second fly-eye lens are moved along the optical axis to make smaller the distance between them, the combined focal length of the first fly-eye lens and the second fly-eye lens becomes longer, which leads to a smaller value of K. In other words, the illuminated area becomes narrower than the effective region of the image forming element and the state is centrally concentrated illumination.

Figure 7:
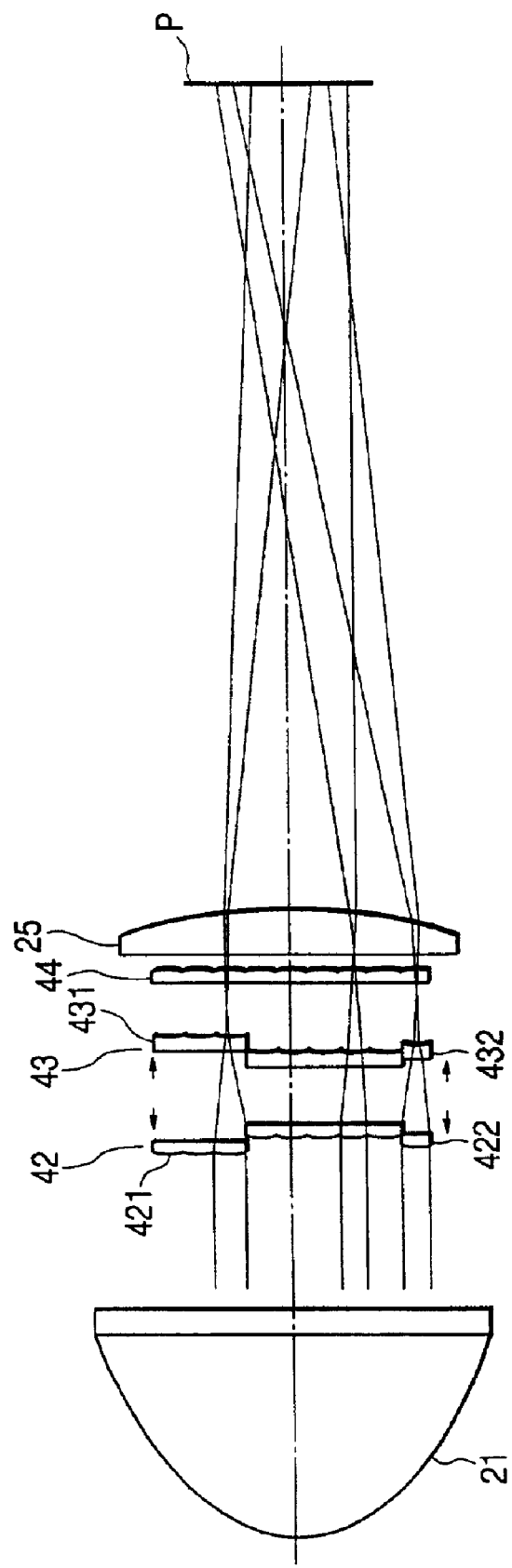
FIG. 7 is an end view of a first modification of the illumination system of Embodiment 2.

In the present embodiment, the fly-eye lenses may be divided into three or more as illustrated in FIG. 7. Such a structure makes it possible to adjust the illumination distribution more finely (a first modification of Embodiment 2).

Figure 8:
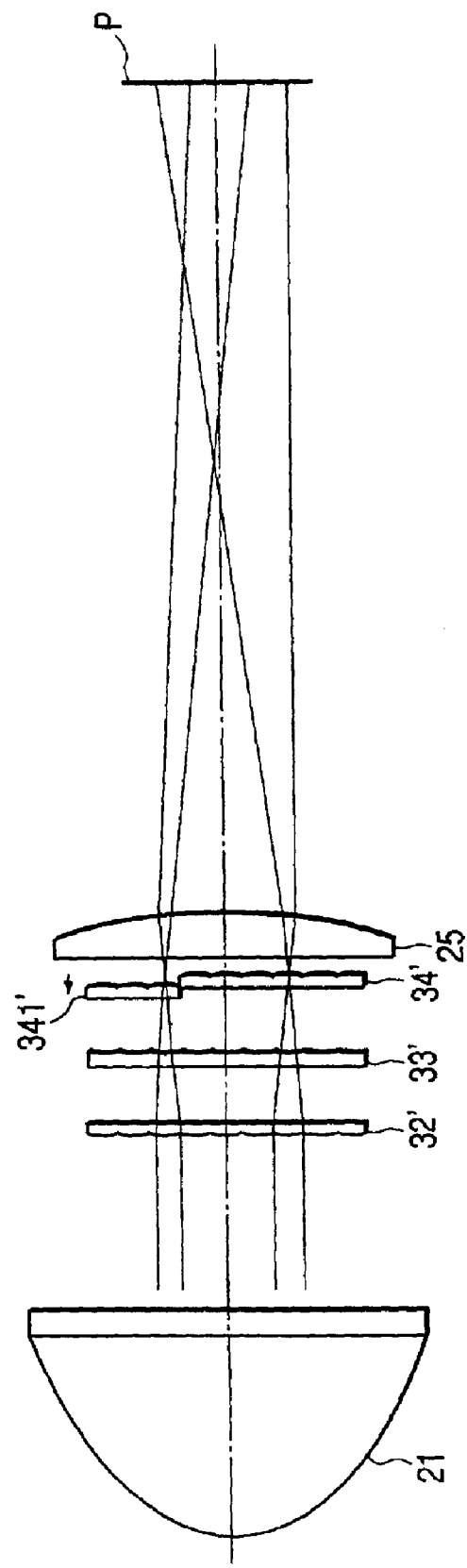
FIG. 8 is an end view of a second modification of the illumination system of Embodiment 2.

Further, in order to simplify the mechanism for moving the fly-eye lenses, as illustrated in FIG. 8, only a part 341' of a fly-eye lens 34' (a part of the third fly-eye lens is illustrated in FIG. 8) may be structured to be moved to change the distance between a second fly-eye lens 33' and the third fly-eye lens 34' (a second modification of Embodiment 2).

(Embodiment 3)

FIGS. 9A and 9B illustrate Embodiment 3 of the present invention. An integrator of the present embodiment is formed of three fly-eye lenses: a first fly-eye lens 51 formed of positive lenses; a second fly-eye lens 52 formed of negative lenses; and a third fly-eye lens 53 formed of positive lenses, from a light source side in this order. Here, the individual lenses forming a fly-eye lens is formed of a plurality of kinds of lenses having different focal lengths.

In the present embodiment, switching of the illumination state is effected by moving a fly-eye lens in a direction perpendicular to an optical axis of an illumination system. The switching of the illumination state is now described with reference to FIGS. 9A and 9B. FIG. 9A illustrates arrangement in uniform illumination. A part of a fly-eye lens is arranged outside the illumination system such that only a portion formed of lenses having the same focal length is used. This makes the same the value of K of all the sets of lenses forming the illumination system, which leads to uniform illumination state. Then, as illustrated in FIG. 9B, the fly-eye lens is moved perpendicularly to the optical axis of the illumination system, sets of lenses having different focal lengths which were outside the illumination system are incorporated in the illumination system, and a part of sets of lenses which were in the illumination system are taken out of the illumination system. Here, by setting the focal lengths of the lenses such that the combined focal lengths of the sets of the lenses newly incorporated in the illumination system becomes longer, the value of K of the illumination system becomes smaller than the value of K of the remaining portion, an area narrower than the effective region of the image forming element is illuminated, and the state is centrally concentrated illumination.

(Embodiment 4)

FIGS. 10A and 10B illustrate Embodiment 4 of the present invention. An integrator of the present embodiment is formed of two fly-eye lenses: a first fly-eye lens 61 formed of positive lenses; and a second fly-eye lens 62 formed of positive lenses, from the side of a light source in this order.

The individual lenses forming a fly-eye lens all have the same focal length. Here, since the individual lenses of the second fly-eye lens have the focal length of ff2, and this applies to all the sets of the lenses, the value of K is the same, which leads to uniform illumination state. A method of switching the illumination state is now described with reference to FIGS. 10A and 10B. In the present embodiment, a third fly-eye lens 63 formed of positive lenses and a fourth fly-eye lens 64 formed of negative lenses are provided outside an illumination system. By inserting these fly-eye lenses in the illumination system, the illumination state is switched. In FIG. 10B, the third and fourth fly-eye lenses are rotated to be inserted in the illumination system. Individual lenses of the inserted fly-eye lenses correspond to a part of the first fly-eye lens and a part of the second fly-eye lens. The focal length ff2 of the illumination system with regard to an optical path where the third and fourth fly eye-lenses are inserted is the combined focal length of the second, third, and fourth fly eye-lenses. Here, by inserting the third fly eye-lens 63 formed of positive lenses on the fly eye-lens 61 side and inserting the fourth fly eye-lens 64 formed of negative lenses on the second fly eye-lens 62 side, the combined focal length can be made larger than the focal length of the second fly eye-lens 62. Since the illuminated area is narrower than the effective region of the image forming element, the state is centrally concentrated illumination. The focal lengths of the individual lenses of the fly-eye lenses inserted here are not required to be the same, and lenses having different focal lengths may be formed to achieve different combined focal lengths.

With regard to the method of inserting the third and the fourth fly-eye lenses, the third fly-eye lens 63 and the fourth fly-eye lens 64 may be inserted by being slid from the outside of the illumination system as illustrated in FIG. 11.

(Embodiment 5)

FIGS. 12A and 12B illustrate Embodiment 5 of the present invention. In the figures, a reflector mirror 21 condenses light from a light source, a first fly-eye lens 22 has a positive refractive power, a second fly-eye lens 23 has a negative refractive power, and a third fly-eye lens 24 has a positive refractive power, which form an integrator for forming an uniformly illuminated area. Reference numeral 25 denotes a condenser lens, and P is an image forming element. Here, the individual lenses forming a fly-eye lens is formed of a plurality of kinds of lenses having different focal lengths.

In the present embodiment, switching of the illumination state is effected by moving the condenser lens in a direction of an optical axis of an illumination system. The switching of the illumination state is now described with reference to FIGS. 12A and 12B. FIG. 12A illustrates arrangement in centrally concentrated illumination. Here, since the values of K of sets of the lenses are not the same, light beams passing through a part of the sets of the lenses illuminate only a center portion of the image forming element, resulting in the centrally concentrated illumination on the image forming element. Then, as illustrated in FIG. 12B, the condenser lens is moved in the direction of the optical axis so that the illuminated area is extended to change the projection magnification of the light beams projected on the image forming element. Then, the fluxes which illuminated only the central portion in FIG. 12A gradually extends the illuminated region until, at last, the whole image forming element is illuminated as illustrated in FIG. 12B. As a result, the whole image forming element is illuminated at uniform illumination.

In the above Embodiments 1 to 4, the methods of switching between the centrally concentrated illumination and the uniform illumination are mainly described. However, the portion where the illumination is concentrated may be other than the central portion. For example, by moving the condenser lens in a direction perpendicular to the optical axis from the state of the centrally concentrated illumination, the portion where the illumination is concentrated may be moved from the central portion.

Further, the present invention may be applied to an HMD (a head mounted display).

Though, in the above embodiments, only one condenser lens (25 in FIG. 1A) is used, the present invention is not limited thereto, and a plurality of lenses as well as a mirror instead of a lens may be used.

Further, though, in the above embodiments, fly-eye lenses are used as the integrator, the integrator is not limited thereto, and any other optical element which functions as the integrator, e.g., an optical tube (a rod integrator) may be used.

Still further, though a polarizing conversion element is preferably provided in every embodiment, the arrangement of such a polarizing conversion element and the like are described only in Embodiment 1.

Figure 15:
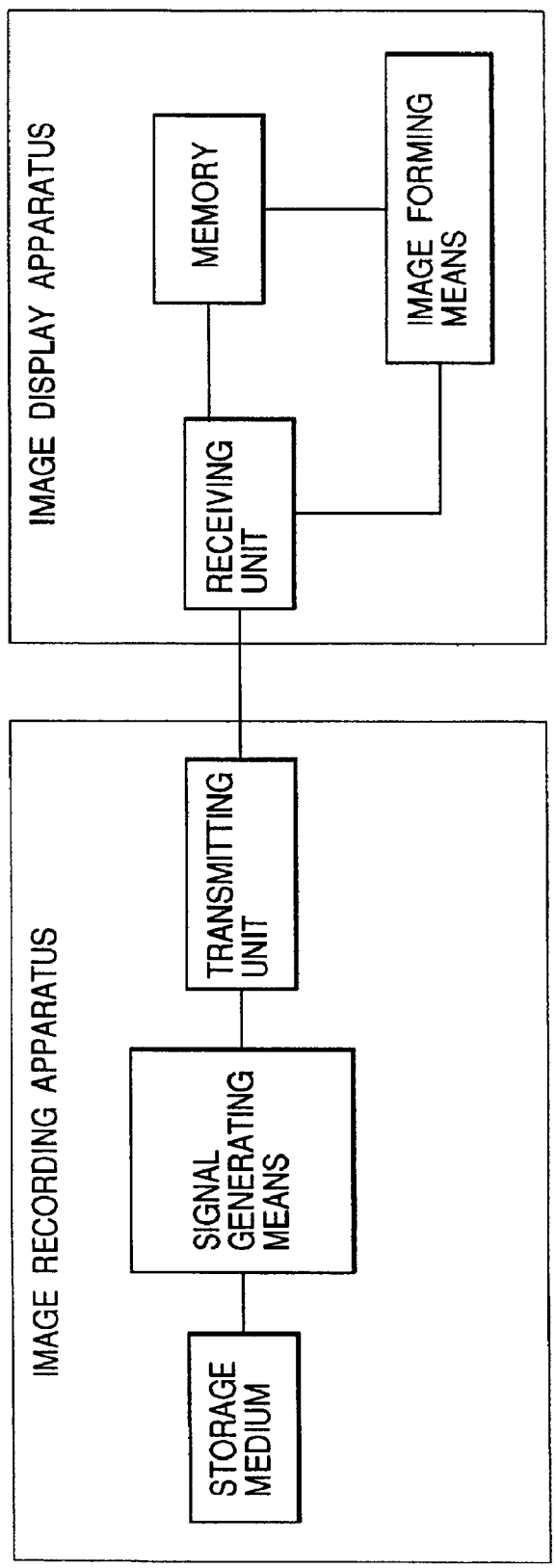
FIG. 15 is a schematic view of a system formed of an image display apparatus according to the present invention and an image recording apparatus.
Figure 16:
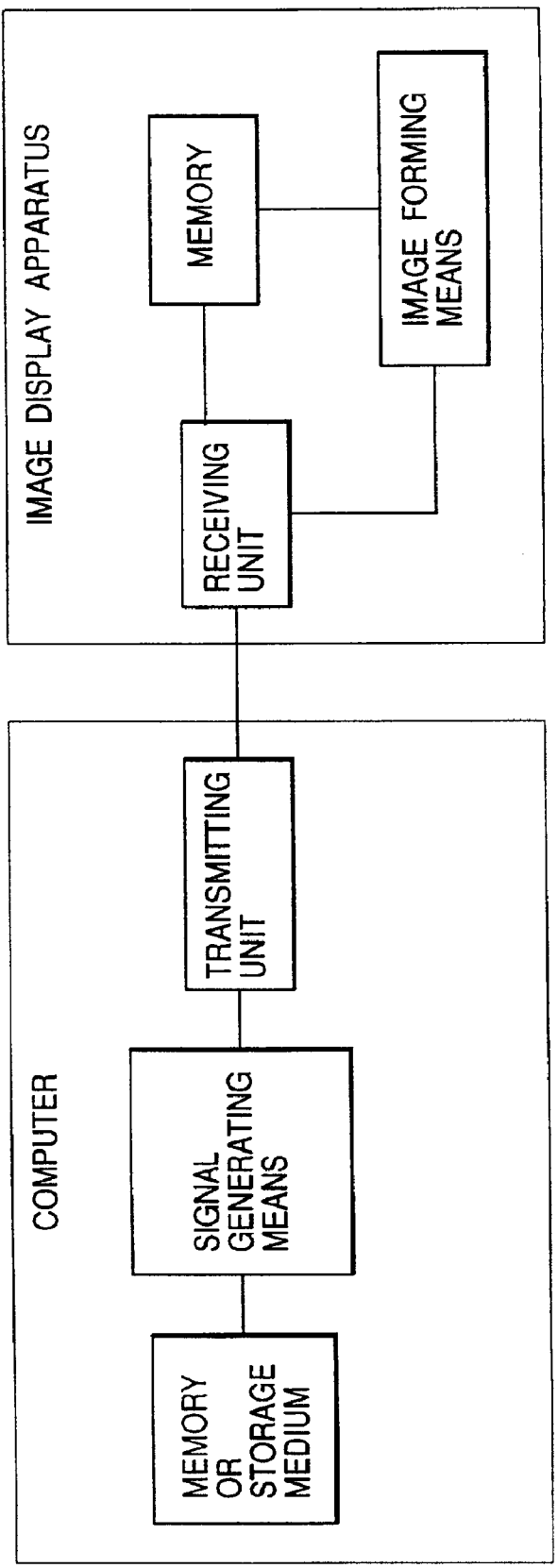
FIG. 16 is a schematic view of a system formed of an image display apparatus according to the present invention and a computer.

FIG. 15 is a schematic view of an image display system having an image recording apparatus such as a video deck or a video camera and an image display apparatus according to the present invention. FIG. 16 is a schematic view of an image display system having a computer and an image display apparatus according to the present invention. These are systems combining an image display apparatus or an illumination system according to the present invention with an apparatus for supplying image signals. Such systems are within the scope of the present invention and are not limited to the embodiments described herein.

Further, only an illumination system in an image display apparatus according to the present invention may be used as, for example, an illumination system of a projection exposure apparatus.

What is claimed is:

1. An illumination system comprising:
    a secondary light source forming member for forming a plurality of secondary light sources with light from a light source,
    wherein an illumination surface is illuminated with a plurality of light beams from said plurality of secondary light sources, and projection magnifications of a part or all of said plurality of light beams to said illuminated surface are changed, thereby varying an illumination distribution on said illuminated surface, and
    wherein said distribution is varied by switching the relationship of the number of overlapping light beams in a central portion of said illuminated surface and the number of overlapping light beams in a peripheral portion of said illuminated surface between different and the same.

2. An illumination system according to claim 1, comprising:
    at least one lens array as said secondary light source forming member; and
    a light condensing optical element, wherein said distribution is varied by moving said light condensing optical element in a direction of an optical axis.

3. An illumination system according to claim 1, comprising:
    at least one lens array as said secondary light source forming member; and
    a light condensing optical element, wherein said distribution is varied by moving at least a part of said at least one lens array.

4. An illumination system according to claim 3, wherein said distribution is varied by moving at least a part of said at least one lens array in a direction of an optical axis.

5. An illumination system according to claim 3, wherein said distribution is varied by moving at least a part of said at least one lens array in a direction perpendicular to an optical axis.

6. An illumination system according to claim 3, wherein said distribution is varied by rotating at least a part of said at least one lens array.

7. An illumination system according to claim 1, comprising:
    at least one lens array as said secondary light source forming member; and
    a light condensing optical element, wherein said distribution is varied by moving at least a part of said at least one lens array.

8. An illumination system according to claim 7, wherein said distribution is varied by moving at least a part of said at least one lens array in a direction of an optical axis.

9. An illumination system according to claim 7, wherein said distribution is varied by moving at least a part of said at least one lens array in a direction perpendicular to an optical axis.

10. An illumination system according to claim 7, wherein said distribution is varied by rotating at least a part of said at least one lens array.

11. An image display apparatus comprising:
at least one image forming element; and
an illumination system according to claim 1 for illuminating said at least one image forming element with light from a light source.

12. An apparatus according to claim 11, further comprising:
a projection optical system for projecting an image formed by said image forming element on a projection surface, wherein said apparatus further comprises a plurality of image forming elements and said projection optical system overlappingly projects on said projection surface images formed by said plurality of image forming elements.

13. An apparatus according to claim 11, wherein said apparatus comprises a plurality of image forming elements at least for red, green, and blue, respectively and said apparatus further comprises a plurality of dichroic mirrors for combining colors from said plurality of image forming elements.

14. An apparatus according to claim 11, wherein said apparatus comprises a plurality of image forming elements at least for red, green, and blue, respectively and said apparatus further comprises a plurality of dichroic prisms for combining colors from said plurality of image forming elements.

15. An illumination system according to claim 1,
wherein an image recording apparatus for supplying an image signal to said apparatus.

16. An illumination system according to claim 1,
wherein a computer for supplying an image signal to said apparatus.

17. An apparatus according to claim 11, further comprising a projection optical system for projecting an image formed by said image forming element on a projection surface, wherein said apparatus has a single image forming element and said projection optical system projects the image formed by said single image forming element on the projection surface.

18. An apparatus according to claim 11 further comprising a projection optical system for projecting an image formed by said image forming element on a projection surface, wherein said apparatus has a single image forming element and said projection optical system projects the image formed by said single image forming element on the projection surface.

19. An illumination system comprising:
a secondary light source forming member for forming a plurality of secondary light sources with light from a light source,
wherein an illuminated surface is illuminated with a plurality of light beams from said plurality of secondary light sources, and projection magnifications of a part or all of said plurality of light beams to said illuminated surface are changed, thereby varying an illumination distribution on said illuminated surface, and
wherein the number of overlapping light beams in a central portion of said illuminated surface is structured to be larger than the number of overlapping light beams in a peripheral portion of said illuminated surface, and projection magnifications of said plurality of light beams to said illuminated surface are changed, thereby varying said distribution in an effective region of said illuminated surface.

20. An illumination system according to claim 19, comprising: at least one lens array as said secondary light source forming member; and a light condensing optical element, wherein said distribution is varied by moving said light condensing optical element in a direction of an optical axis.

21. An image apparatus comprising:
at least one image forming element; and
an illumination system according to claim 19 for illuminating said at least one image forming element with light from a light source.

22. An image display apparatus according to claim 21, further comprising an image storing apparatus for supplying image signal to said image display apparatus.

23. An image display apparatus according to claim 21, further comprising a computer for supplying image signal to said image display apparatus.

24. An illumination system comprising:
a secondary light source forming member for forming a plurality of secondary light sources by a light source,
wherein a plurality of light beam coming from said plurality of secondary light sources illuminate an illuminated surface, and projection magnifications of a part or all of said plurality of light beams to said illuminated surface are changed to vary an illumination distribution in an effective region of said illuminated surface, and
wherein said distribution is varied by moving and rotating at least a part of said secondary light source forming member.

25. An illumination system according to claim 24, further comprising a light condensing optical element,
wherein said secondary light source forming member includes at least one lens array; and
wherein said distribution is varied by moving said light condensing optical element in a direction of an optical axis.

26. An illumination system according to claim 24, wherein said distribution is varied by moving at least a part of said at least one lens array in a direction of an optical axis.

27. An illumination system according to claim 24, wherein said distribution is varied by moving at least a part of said at least one lens array in a direction perpendicular to an optical axis.

28. An image apparatus comprising:
at least one image forming element; and
an illumination system according to claim 24 for illuminating said at least one image forming element with light from a light source.

29. An image apparatus according to claim 28, further comprising an image storing apparatus for supplying image signal to said image display apparatus.

30. An image apparatus according to claim 28, further comprising a computer for supplying image signal to said image display apparatus.

31. An illumination system comprising:
a secondary light source forming member for forming a plurality of secondary light sources by a light source,
wherein a plurality of light beams coming from said plurality of secondary light sources illuminate an illuminated surface, and projection magnifications of a part or all of said plurality of light beams to said illuminated surface are changed to vary an illumination distribution in an effective region of said illuminated surface, and
wherein said distribution is varied by switching the relationship of the number of said plurality of light beams coming from said plurality of secondary light sources are overlapped in a central portion of the effective region and the number of said plurality of light beams coming from said plurality of secondary light sources are overlapped in a peripheral portion of the effective region between different and the same.

32. An illumination system according to claim 31, comprising:
at least one lens array as said secondary light source forming member; and
a light condensing optical element, wherein said distribution is varied by moving at least a part of said at least one lens array.

33. An illumination system according to claim 32, wherein said distribution is varied by moving at least a part of said at least one lens array in a direction of an optical axis.

34. An illumination system according to claim 32, wherein said distribution is varied by moving at least a part of said at least one lens array in a direction perpendicular to an optical axis.

35. An illumination system according to claim 32, wherein said distribution is varied by rotating at least a part of said at least one lens array.

36. An image apparatus comprising:
at least one image forming element; and
an illumination system according to claim 31 for illuminating said at least one image forming element with light from a light source.

37. An image display apparatus according to claim 36, further comprising an image storing apparatus for supplying image signal to said image display apparatus.

38. An image display apparatus according to claim 36, further comprising a computer for supplying image signal to said image display apparatus.

39. An illumination system comprising:
a secondary light source forming member for forming a plurality of secondary light source by a light source,
wherein a plurality of light beams coming from said plurality of secondary light sources illuminate an illuminated surface, and
wherein the number of said plurality of light beams coming from said plurality of secondary light sources are overlapped in a central portion of said illuminated surface is larger than the number of said plurality of light beams coming from said plurality of secondary light sources are overlapped in a peripheral portion of said illuminated surface, and projection magnification of a part or all of said plurality of light beams to said illuminated surface are changed to vary an illumination distribution in an effective region of said illuminated surface.

40. An illumination system according to claim 39, further comprising a light condensing optical element,
wherein said secondary light source forming member includes at least one lens array; and
wherein said distribution is varied by moving said light condensing optical element in a direction of an optical axis.

41. An image apparatus comprising:
at least one image forming element; and
an illumination system according to claim 39 for illuminating said at least one image forming element with light from a light source.

42. An image display apparatus according to claim 41, further comprising an image storing apparatus for supplying image signal to said image display apparatus.

43. An image display apparatus according to claim 41, further comprising a computer for supplying image signal to said image display apparatus.

44. An image display apparatus comprising:
at least one image forming element for forming an image in an effective region; and
a secondary light source forming element for forming a plurality of secondary light source with light from a light source,
wherein said at least one image forming clement is illuminated by using a plurality of light beam from a light source, and projection magnifications of a part or all of said plurality of light beams to said at least one image forming element are changed, whereby, in a case that images formed by said at least one image forming element concentrate at a central part rather than a peripheral part of the effective region, an image display apparatus controls a brightness of the central part to be brighter than that of a peripheral part, or in a case that images formed by said at least one image forming element are disperesed at a central part and a peripheral part, an image display apparatus controls a brightness of the central part to be substantially caqual to that of a peripheral part of the effective region.

45. An image display apparatus according to claim 44, further comprising an image storing apparatus for supplying image signal to said image display apparatus.

46. An image display apparatus according to claim 44, further comprising a computer for supplying image signal to said image display apparatus.

* * * * *

UNITED STATES PATENT AND TRADEMARK OFFICE
CERTIFICATE OF CORRECTION

PATENT NO.         : 7,040,761 B2
APPLICATION NO.    : 09/877768
DATED              : May 9, 2006
INVENTOR(S)        : Atsushi Okuyama et al.

It is certified that error appears in the above-identified patent and that said Letters Patent is hereby corrected as shown below:

At column 5, line 33, replace "1f" with "If."

At column 10, line 18, replace "illumination surface" with --illuminated surface."

At column 12, line 8, replace "image apparatus" with "image display apparatus."

At column 12, line 22, replace "beam" with "beams."

At column 13, line 36, replace "secondary light source" with "secondary light sources."

At column 14, line 27, replace "clement" with "element".

Signed and Sealed this

Twenty-second Day of August, 2006

JON W. DUDAS
*Director of the United States Patent and Trademark Office*